March 29, 1927.
M. L. PATTERSON
SEARCHLIGHT TRUCK
Filed March 16, 1922
1,622,392
2 Sheets-Sheet 1
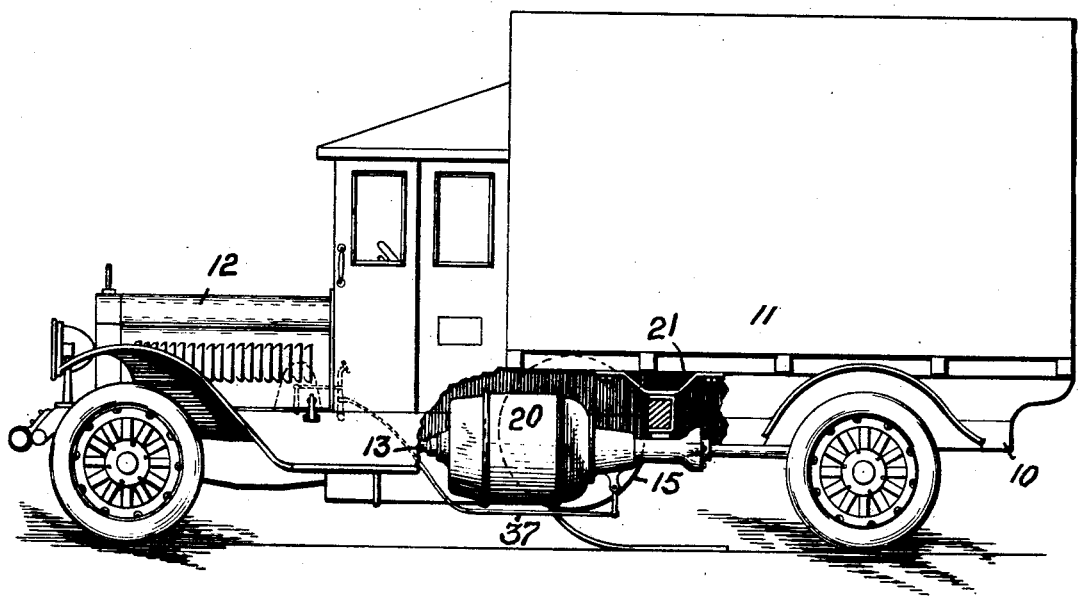
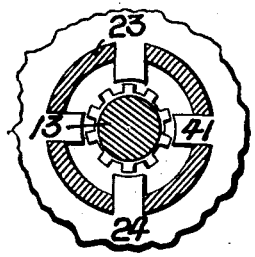
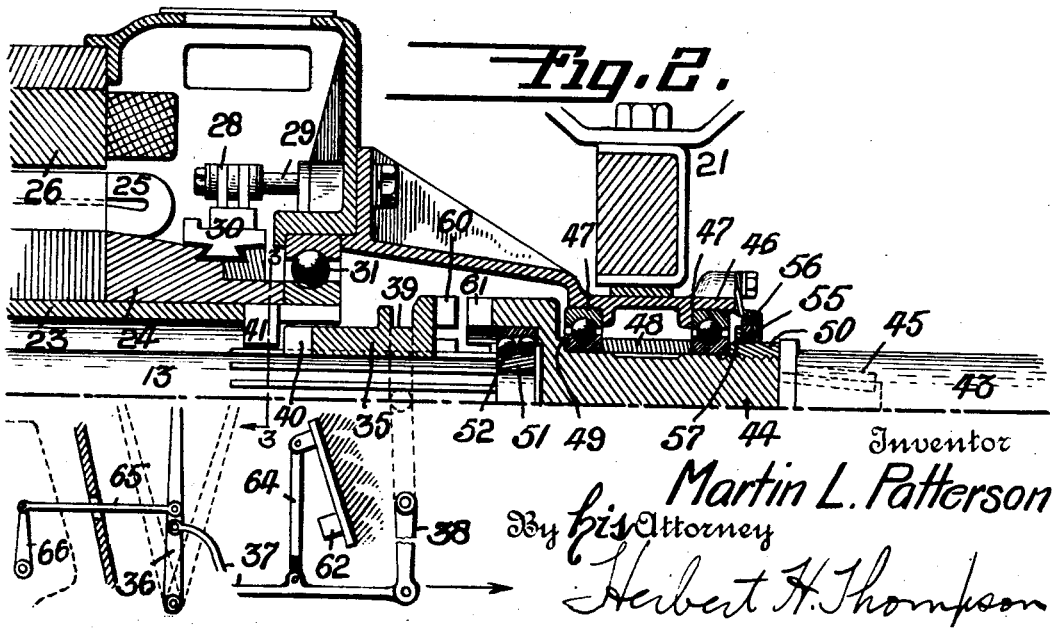
Inventor
Martin L. Patterson
By his Attorney
Herbert H. Thompson March 29, 1927.
M. L. PATTERSON
SEARCHLIGHT TRUCK
Filed March 16, 1922
1,622,392
2 Sheets-Sheet 2
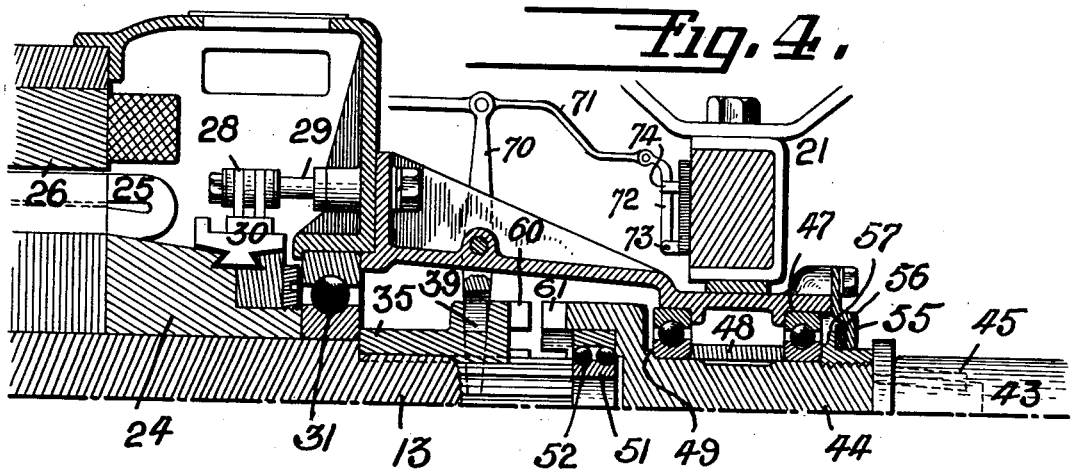
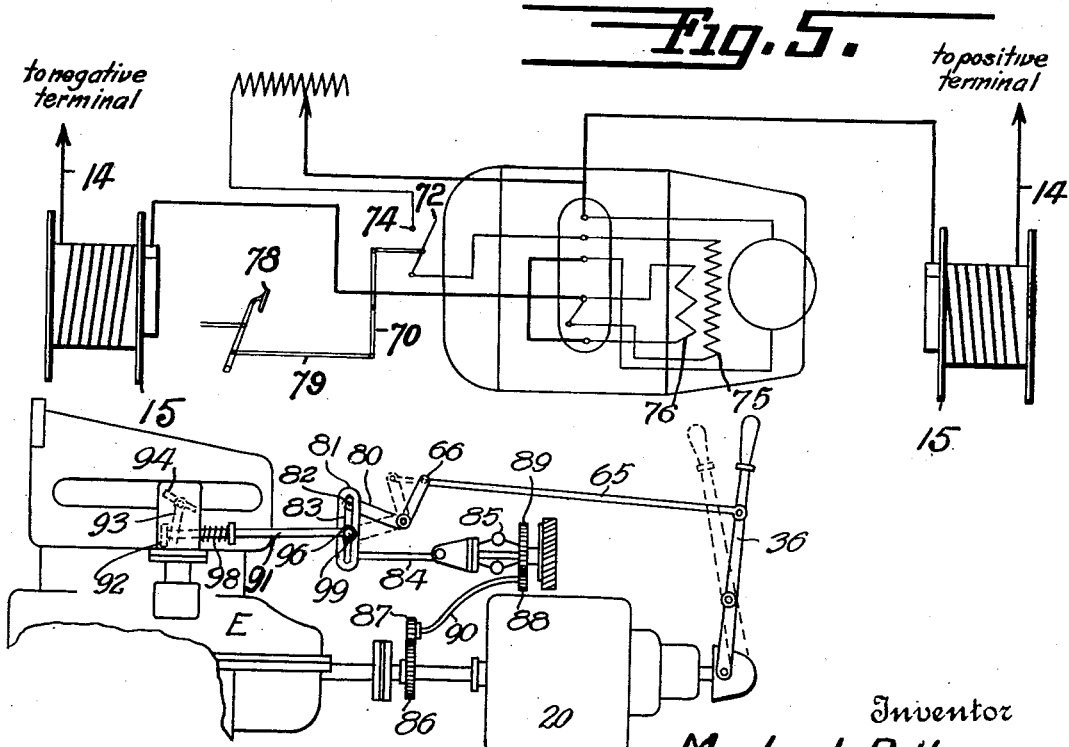
Inventor
Martin L. Patterson
By his Attorney
Herbert H. Thompson Patented Mar. 29, 1927.

1,622,392

UNITED STATES PATENT OFFICE.

MARTIN L. PATTERSON, OF BOGOTA. NEW JERSEY, ASSIGNOR TO THE SPERRY GYROSCOPE COMPANY, OF BROOKLYN, NEW YORK, A CORPORATION OF NEW YORK.

SEARCHLIGHT TRUCK.

Application filed March 16, 1922. Serial No. 544,192.

This invention relates to power units of self-propelled vehicles, and is particularly adapted for operating flood-lighting outfits, electric welding units, searchlights, and other power-driven mechanisms which it is desired to move from place to place without dismounting or rendering them temporarily inoperative.

It is one object of this invention to provide an automotive vehicle with a power unit for propelling the vehicle, and an auxiliary electric generating unit operated by said power unit and adapted to operate an electrically operated device generally carried by the vehicle.

It is a further object of this invention to provide simple, effective means whereby the auxiliary generating unit is automatically rendered ineffective when the power unit is employed to propel the vehicle.

Still another object of this invention is the provision of a single operating member whereby either the auxiliary generating unit or the vehicle propelling means may be rendered effective or ineffective at will and whereby both said auxiliary unit and said vehicle propelling means may be simultaneously rendered ineffective.

Other objects and advantages will hereinafter appear.

In the accompanying drawings,

Fig. 1 is a side elevation, with parts broken away, of a self-propelled vehicle embodying this invention.

Fig. 2 is a side view, vertically sectioned, of the auxiliary generating unit.

Fig. 3 is a section taken on the line 3—3 of Fig. 2.

Fig. 4 is a side view, vertically sectioned, of a modified form of auxiliary generating unit.

Fig. 5 is a wiring diagram.

Fig. 6 is a view, largely diagrammatic, showing one form of device for limiting the speed of the engine to the capacity of the generator.

Referring to Figs. 1 to 3 inclusive of the drawings, there is shown a self-propelled vehicle of the motor truck type comprising a chassis 10 and a body 11, said chassis having an engine positioned in the forward end thereof beneath cowl 12 for driving a shaft 13 having connections to the driving axle. The engine may be of the usual internal combustion type and constitutes the power-unit.

In the body 11 of the vehicle is carried a device such as a flood-lighting outfit, an electric welding unit, a searchlight, etc., which requires electric power for its operation. During operation, the electrically operated device may be taken off the vehicle to the place where it is to be operated, the cables 14 (see Fig. 5) which conduct the current to said device being wound upon or unwound from reels 15 mounted on the vehicle.

To provide the necessary electric power for operating the device carried in the body 11, there is provided a generator 20 surrounding the driving shaft 13 and supported from the chassis in any suitable manner as by a bracket 21. The generator comprises a sleeve surrounding the shaft and upon which is mounted the armature comprising the core 24 and the winding 25, said armature operating in a field established by the poles 26. The current may be carried off by brushes 28 fixed upon a post 29 mounted in the generator casing, said brushes contacting with a commutator 30 mounted on the armature in any suitable manner. Ball bearings 31 may be interposed between the ends of the armature and the fixed frame of the generator.

It will thus be apparent that electric current may be generated by rotating the armature. This invention utilizes the engine or power unit to rotate said armature by connecting it to the driving shaft 13. For this purpose there is provided a clutch 35 splined upon shaft 13 and operated lengthwise of said shaft by any suitable means such as an operating lever or handle 36 pivoted upon the vehicle and to which is connected a link 37 pivotally connected to one arm of a lever 38 pivoted upon the vehicle, the upper end of said lever 38 engaging in a circumferential groove 39 in the clutch. Actuation of the handle 36 will thus operate the clutch forwardly and rearwardly along the shaft 13. The clutch when moved forwardly effects engagement with the armature by means of teeth or projections 40 on the clutch connecting with grooves 41 formed in the collar 23 of the armature. When the clutch has been moved forwardly until the projections 40 engage in grooves 41 the armature is locked to the driving shaft, and if the usual clutch which connects the engine to the driving shaft is thrown in, the shaft 13 will be rotated to operate the generator.

Ordinarily the rotation of the driving shaft would operate to propel the vehicle. To enable the generator to be operated from the driving shaft without also propelling the vehicle, the shaft 13 does not extend rearwardly to the driving axle, but may be connected thereto through a clutch which connects shaft 13 to a shaft 43 extending rearwardly to the driving axle. To shaft 43 is keyed a connecting member 44 by a key 45 at one end of said member, said connecting member being journalled in an extension 46 of the generator casing and revolubly supported at its other end by ball bearings 52 upon the adjacent end 51 of the shaft 13. Bearings 47 spaced apart by a spacing member 48 to press said bearings against a shoulder 49 formed on member 44 and a collar 50 threaded upon said member, may be provided, the collar 50 being held in position by the end plate 55 of the generator casing pressing against a felt gasket 56 interposed between said end-plate and a flange 57 on said collar. To drive the rear axle, this invention utilizes the same clutch 35 which is employed to operate the generator from shaft 13. For this purpose the opposite or rear end of the clutch is provided with teeth or projections 60 similar to teeth 40, which engage in corresponding grooves 61 in the adjacent end of the connecting member 44. To cause clutch 35 to engage the member 44 and drive shaft 43, and hence propel the vehicle, handle 36 must be swung to move clutch 35 to the rear end of its throw where it engages the connecting member. But by so operating the clutch, the latter has been moved out of engagement with the armature of the generator, so that said armature ceases to rotate and no further current is generated. It is thus obvious that when clutch 35 is in position to cause the vehicle to be propelled, the generator does not function and that when clutch 35 is in position to cause the generator to be operated, the vehicle is not propelled. When the clutch 35 is centrally positioned, then the generator is not operated nor is the vehicle propelled when the engine rotates shaft 13. In operation, the clutch 35 is shifted from central position to forward or rearward position, as desired, and the usual clutch of the auto-vehicle is operated to cause shaft 13 to be rotated by the engine.

To prevent generation of current within the generator while the vehicle is being propelled and the consequent drag on the machine, an ordinary hand-operated switch may be interposed in the circuit, or an automatic switch may be provided to break the field circuit of the generator whenever the clutch 35 has been shifted rearwardly to cause propulsion of the vehicle. Said switch comprises a fixed contact 62 and a blade 64 connected to a link 37 at one end and pivoted at the other end, so that forward movement of link 37 to cause rearward movement of clutch 35 will automatically open the switch and maintain it open, while rearward movement of link 37 to cause forward movement of clutch 35 will close the switch.

To handle 36 may be connected means (here shown as links 65 and 66) for operating a governor of any ordinary type to limit the speed of the engine to the capacity of the generator when handle 36 is actuated to slacken the generator.

One form of device for accomplishing this function is illustrated in Fig. 6 wherein will be recognized the handle 36, links 65 and 66, generator 20 and the internal combustion engine E. Link 66 may be provided with a fixed extension 80 in the form of an arm operating between two similar spaced members 81 and having a pin 82 near the end thereof operating in aligned slots 83 in said members 81. Said members 81 may be pivotally connected at one end, here shown as their lower ends, to a link 84 connected to a governor 85, which may be of ordinary type, and driven in some manner from the engine shaft as by gears 86—87—88—89 interconnected by flexible shaft 90. A rod 91 has a fork 92 engaging one end of link 93, the other end of which is connected to the pivotaly axis of a butterfly valve 94 of the intake manifold of the engine. The other end of link 91 may terminate in a fork, the arms 96 of which are pivoted as at 99 upon projections or ears formed preferably integrally with the respective slotted members 81, the pivotal connection 99 between ears 96 and the slotted members 81 being central of the slots 83 in front elevation, as shown. By this construction it will be apparent that the axis of pin 82 at the end of arm 80 may be in alignment with the pivotal axis 99. Link 91 is normally operated (to the right in Fig. 6) by a spring 98 in such direction as to maintain the butterfly valve 94 in open position.

In operation, when the handle 36 occupies the full line position, the pin 82 is at the upper end of slots 83 and the generator is clutched to the engine. In this position it is desired that the governor shall be effective to control the speed of the engine in order not to exceed the voltage capacity of the generator. If the engine speeds up excessively the governor will draw link 84 to the ring, swinging slotted members 81 about relatively fixed pivot 82 to operate link 91 to the right against the action of spring 98 to move valve 94 in a closing direction and thus limit the speed of the engine. When, however, handle 36 is in the dotted line position to unclutch the generator 20 and cause the engine to drive the truck, then it is desired that the governor shall not operate to control the valve 94, or at least to control the valve to a less extent. When handle 36 is in the dotted line position link 66 has been rotated so that the axis of pin 82 is more nearly in alignment with the pivotal axis 99. Any movement of link 84, due to the governor 85 will now cause rotation of slotted members 81 about pivotal axis 82—99 without any or at least with less lateral motion of link 91 and hence will have less or no effect upon the valve 94 or the speed of the engine. It will be obvious that the connection between link or rod 91 is such that it will not interfere with the ordinary operation of valve 94 by the usual operating mechanism.

In the modification illustrated in Fig. 4, the sleeve 23 is formed integral with the driving shaft 13 so that the armature rotates whenever the driving shaft is rotated by the engine. When the clutch is in rearward position, however, to cause the vehicle to be propelled, it is essential that the field circuit of the generator be broken, otherwise the rotating armature will cause loss due to magnetic retardation of the armature and may generate a voltage which may damage the windings. The lever 70 which is operated to shift the clutch is therefore connected to a circuit breaker so that rearward shifting of the clutch when it is desired to propel the vehicle will automatically break the field circuit of the generator. For this purpose, a link 71 may be connected to lever 70 so that when the latter is operated to shift the clutch rearwardly, link 71 is drawn forwardly to swing blade 72 about fixed pivot 73 out of engagement with contacts 74. When clutch 35 is operated to the forward end of its stroke, the field circuit of the generator is closed. It is thus impossible for the generator to function when the vehicle is being propelled.

Fig. 5 illustrates diagrammatically the device shown in Fig. 4. The generator comprises a series coil 76 and a shunt coil 75 and is of the usual type. The lever 70 is shown as operated by a handle or foot-pedal 78 through a link 79 connected to a lever 70. The wiring shown in Fig. 5 is also diagrammatic and it will be understood that the usual switchboard with its control and indicating apparatus may be interposed in the circuit in the usual manner.

It will be understood that the power unit may be used to actuate not merely the driving mechanism of a vehicle, but any operating device, while the auxiliary generating unit may also be utilized to operate any of a plurality of devices as hereinbefore set forth.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. In combination, a power unit, an auxiliary electric generating unit operated by said power unit, an operating device, means whereby said power unit may actuate said operating device, and means for automatically breaking a circuit of said auxiliary unit when said first named means is actuated to cause said power unit to actuate said device.

2. In an automotive vehicle, a power unit, an auxiliary electric power generating unit operated by said power unit, means whereby said vehicle may be propelled by said power unit, and means for automatically breaking a circuit of said auxiliary unit when said first named means is actuated to cause said power unit to propel said vehicle.

3. In an automotive vehicle having a driving axle, a power unit mounted on said vehicle, an auxiliary generating unit, a shaft driven by said power unit, said auxiliary unit comprising an electric generator, means whereby said shaft may be connected to said generator to operate the latter, said means being movable to connect said shaft to the driving axle to propel the vehicle and simultaneously break a circuit of said generator.

4. In an automotive vehicle having a driving axle, a power unit mounted on said vehicle, an auxiliary generating unit, a shaft driven by said power unit, said auxiliary unit comprising an electric generator, means whereby said shaft may be connected to said generator to operate the latter, and a switch controlling a circuit of said generator, said means being movable to connect said shaft to the driving axle to propel the vehicle and being connected to said switch to simultaneously break a circuit of said generator.

5. In combination, a power unit, an auxiliary power-generating unit, an operating device, means for connecting said auxiliary unit to said power unit to be driven thereby, said means being movable to connect said device to said power unit to be operated thereby and simultaneously break a circuit of said generator.

6. In combination, a power unit, an auxiliary power-generating unit, an operating device, means for connecting said auxiliary unit to said power unit to be driven thereby, said means being movable to connect said device to said power unit to be operated thereby and simultaneously disconnect said auxiliary unit from said power unit, and a continuously actuated governor for controlling said power unit, said means also operating to vary the effect of the governor on said power unit.

7. In an automotive vehicle, a power unit, an auxiliary power-generating unit operated by said power unit, means whereby said vehicle may be propelled by said power unit, means for preventing operating of said auxiliary unit when said power unit propels said vehicle, and a governor driven from the engine for controlling said power unit, said last-named means also operating to vary the effect of said governor according as whether said power unit is driving said auxiliary unit or the vehicle.

8. In an automotive vehicle having a driving axle, a power unit mounted on said vehicle, an auxiliary generating unit operated by said power unit, said auxiliary unit comprising an electric generator, a shaft driven by said power unit, a clutch movable to connect said driving axle to said shaft to propel the vehicle, and a switch controlling a circuit of said generator, said clutch being connected to said switch so that the latter is held open while said clutch connects said shaft to said driving axle.

9. In combination, a power unit, an auxiliary generating unit, an operating device adapted to be operated by said power unit, means for connecting said auxiliary unit to said power unit and simultaneously disconnecting said operating device therefrom, a governor, and means whereby operation of said first named means to render said auxiliary unit effective automatically also renders effective said governor to limit the speed of the power unit to the capacity of said auxiliary unit.

10. In combination, a power unit, a shaft driven thereby, an auxiliary electric generating unit comprising an armature engageable with said shaft, and a relatively stationary field coil, and operating device, means for connecting said operating device to said shaft, and means whereby the circuit through said field coil is broken when said device is connected to said shaft.

11. In combination, a power unit, a shaft driven thereby, an auxiliary electric generating unit comprising an armature engageable with said shaft, and a relatively stationary field coil, an operating device, a clutch movable to connect said operating device to said shaft, a switch controlling the circuit through said field coil, and means whereby said switch is opened when said clutch is operated to connect said device to said shaft.

12. In an automotive vehicle having a driving axle, a power unit mounted on said vehicle, a shaft driven by said unit, an auxiliary electric generating unit comprising an armature engageable with said shaft, and a relatively stationary field coil, a clutch movable to connect said driving axle to said driven shaft to propel the vehicle, a switch controlling the circuit through said field coil, and means whereby said switch is opened when said clutch connects said axle to said shaft.

13. In an automotive vehicle, the combination with the engine, of a generator driven thereby, a driven shaft for driving the vehicle, a clutch detachably connecting the engine and said shaft, an automatic governor for the engine, and means for throwing out said governor when said clutch is thrown in.

14. In an automotive vehicle, the combination with the engine, of a generator driven thereby, a driven shaft for driving the vehicle, a clutch detachably connecting the engine and said shaft, an automatic governor for the engine, and means for altering the effect of said governor when said clutch is moved from one to the other position.

In testimony whereof I have affixed my signature.

MARTIN L. PATTERSON.